(12) United States Patent
Choi

(10) Patent No.: US 6,769,737 B2
(45) Date of Patent: Aug. 3, 2004

(54) APPARATUS FOR LOCKING A RECLINER OF A FRONT SEAT IN AN AUTOMOBILE

(75) Inventor: Byung Young Choi, Kyungki-Do (KR)

(73) Assignee: Hyundai Motor Company, Seocho-Ku (KR)

( * ) Notice: Subject to any disclaimer, the term of this patent is extended or adjusted under 35 U.S.C. 154(b) by 0 days.

(21) Appl. No.: 10/321,095

(22) Filed: Dec. 16, 2002

(65) Prior Publication Data

US 2004/0026969 A1 Feb. 12, 2004

(30) Foreign Application Priority Data

Aug. 8, 2002 (KR) .................................. 10-2002-0046949

(51) Int. Cl.⁷ ................................................. B60N 2/42
(52) U.S. Cl. ............................ 297/216.14; 297/216.13; 297/284.4
(58) Field of Search ........................... 297/216.12, 408, 297/303.1, 216.13, 216.14, 378.12, 368, 369, 363, 364, 365, 284.4; 296/68.1

(56) References Cited

U.S. PATENT DOCUMENTS

| | | | | |
|---|---|---|---|---|
| 3,058,148 A | * | 10/1962 | Beierbach et al. | .......... 297/369 |
| 4,159,847 A | * | 7/1979 | Arai | ......... 297/284.4 |
| 4,767,158 A | * | 8/1988 | Satoh | ......... 297/367 |
| 5,927,804 A | * | 7/1999 | Cuevas | ......... 297/216.12 |
| 5,967,611 A | * | 10/1999 | York et al. | ......... 297/368 |
| 6,024,406 A | * | 2/2000 | Charras et al. | ........ 297/216.14 |
| 6,033,017 A | * | 3/2000 | Elqadah et al. | .......... 297/216.1 |
| 6,340,206 B1 | * | 1/2002 | Andersson et al. | .... 297/216.14 |
| 6,352,285 B1 | * | 3/2002 | Schulte et al. | .............. 280/756 |
| 6,354,662 B1 | * | 3/2002 | Su | .......... 297/284.7 |
| 6,367,859 B1 | * | 4/2002 | Flory et al. | ................. 296/68.1 |
| 6,523,892 B1 | * | 2/2003 | Kage et al. | ............. 297/216.13 |
| 6,616,227 B2 | * | 9/2003 | Blendea et al. | .......... 297/284.4 |

FOREIGN PATENT DOCUMENTS

JP 06245835 A * 9/1994 ........... A47C/1/025

* cited by examiner

*Primary Examiner*—Peter M. Cuomo
*Assistant Examiner*—Stephen D'Adamo
(74) *Attorney, Agent, or Firm*—Morgan Lewis & Bockius LLP

(57) ABSTRACT

An apparatus for locking a recliner of a front seat in an automobile comprises a supporting panel installed in a seat frame of a seat back for supporting the back of a passenger. A sliding bar is attached to the supporting panel and moves up and down following a guide bracket installed in both ends of the seat frame. A spring connects the sliding bar to the seat frame in order to enable the sliding bar to move elastically. An upper gear bar is downwardly attached on the lower end of the sliding bar and is provided with gear teeth on the front end thereof. A lower gear bar has gear teeth following the longitudinal direction thereof and connects both ends of the seat cushion frame. The lower gear bar engages with gear teeth of the upper gear bar selectively.

3 Claims, 4 Drawing Sheets

APPARATUS FOR LOCKING A RECLINER OF A FRONT SEAT IN AN AUTOMOBILE

FIELD OF THE INVENTION

The present invention relates to an apparatus for locking a recliner of a front seat in an automobile, and more particularly to such an apparatus for preventing the seat back of the front seat from being bent toward the rear seat when the rear of the automobile is impacted by an outer force such as a collision.

BACKGROUND OF THE INVENTION

Generally, a front seat in an automobile has a recliner enabling control of the angle of the seat back. The recliner conforms to the posture of a driver and is important for the comfort of the driver.

When the rear part of the automobile is impacted by an outer force such as a rear end collision, the weight of the driver is directly transferred to the recliner supporting the seat back, and thereby the recliner can be damaged. This can cause a problem in that the seat back is bent toward the rear seat. Therefore, the driver, and especially the back of the driver, may be injured, and also a passenger, who takes the rear seat, may be injured by the seat back of the front seat.

Automobile manufacturers have generally adopted a reinforcement structure on the single recliner or to use both recliners instead of single recliner as prior art in order to prevent the recliners from being damaged. The recliner for controlling the angle of the seat back generally controls the angle by engaging an inside gear with an outside gear.

However, the recliner of the seat back should be slim because the space where the recliner is installed is limited. Given this limited space, it is difficult or not possible to arrange the inside gear and the outer gear so as to have strong resistance to collision forces in the structure of the recliner.

SUMMARY OF THE INVENTION

The present invention provides an apparatus for locking a recliner of a front seat in an automobile wherein when the rear part of the automobile is impacted by great outer force such as automobile crashing and then the weight of a passenger taking the front seat is transferred to the seat back, the recliner of the seat back is safely locked and is not bent back, and thereby the passenger can be protected from the impact generated by great outer force such as automobile crashing.

According to embodiments of the present invention, an apparatus for locking a recliner of a front seat in an automobile includes a supporting panel for supporting the back of a passenger. The supporting panel is preferably installed in the seat frame of the seat back. A sliding bar moves up and down, following a guide bracket installed in both ends of the seat frame. A spring elastically connects the sliding bar to the seat frame so that the sliding bar can elastically move. An upper gear bar is attached on the lower end of the sliding bar and is provided with gear teeth on the front end thereof. A lower gear bar connects both ends of the seat cushion frame, the lower gear bar having gear teeth following the longitudinal direction thereof and engaging with the gear teeth of the upper gear bar.

In an apparatus according to a preferred embodiment of the present invention, when the rear part of the automobile is impacted by an outer force such as a rear end collision and the upper body of a passenger in the front seat presses into the seat back, the weight of the upper body is transferred to the sliding bar through the supporting panel built in the seat back. Further, the sliding bar presses the upper gear bar downwardly and thereby the gear teeth formed on the front end of the upper gear bar are engaged with the gear teeth of the lower gear bar which are arranged longitudinally under the upper gear bar.

Therefore, when most of the weight of the passenger is applied to the seat back in a collision, the upper gear bar is forcibly engaged with the lower gear bar and then the recliner is locked. Thereby, it can reliably prevent the seat back mounted on the front seat from being bent back.

A further preferred embodiment of the invention comprises a sliding bar disposed in a seat back for downward movement in response to impact forces transmitted thereto. An upper bar is attached to the sliding bar and extends downward therefrom. Locking members are formed on an end of the upper bar opposite the sliding bar, and a lower bar is attached to a seat bottom. Corresponding locking members are formed on the lower bar such that when the sliding bar is moved downward due to impact force, the upper bar locking members engage the lower bar locking members to lock the seat back with respect to the seat bottom. The locking members preferably comprise gear teeth.

A preferred embodiment may further comprise biasing means acting on the sliding bar to bias the bar upward towards an unlocked position in the absence of an impact force. A support panel also may be secured to an upper portion of the sliding bar.

BRIEF DESCRIPTION OF THE DRAWINGS

The characteristics and advantages of the present invention will become more apparent by describing in detail preferred embodiments thereof with reference to the attached drawings, in which.

DETAILED DESCRIPTION OF THE INVENTION

Hereinafter, the apparatus for locking the recliner of the front seat in the automobile according to preferred embodiments of the present invention will be explained in more detail with reference to the accompanying drawings.

Figure 1:
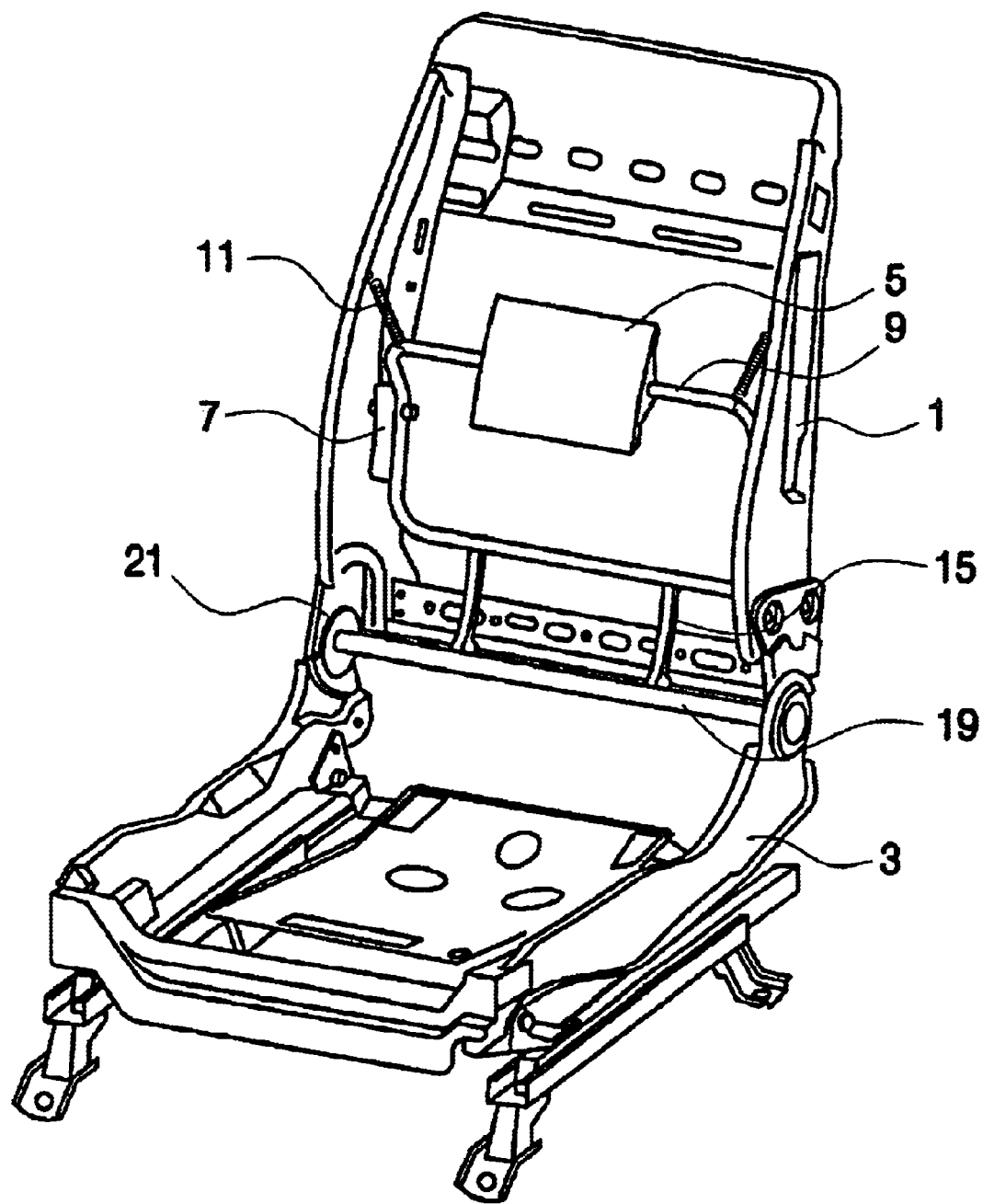
FIG. 1 is a perspective view of a whole frame of a front seat provided with an apparatus for locking a recliner of a front seat in an automobile according to a preferred embodiment of the present invention.

As shown in FIG. 1, an apparatus according to a preferred embodiment of the present invention is fixedly installed in the seat back frame 1, which is installed in the seat back of the front seat of the automobile and attached to the inner frame 3 of the seat cushion.

Figure 2:
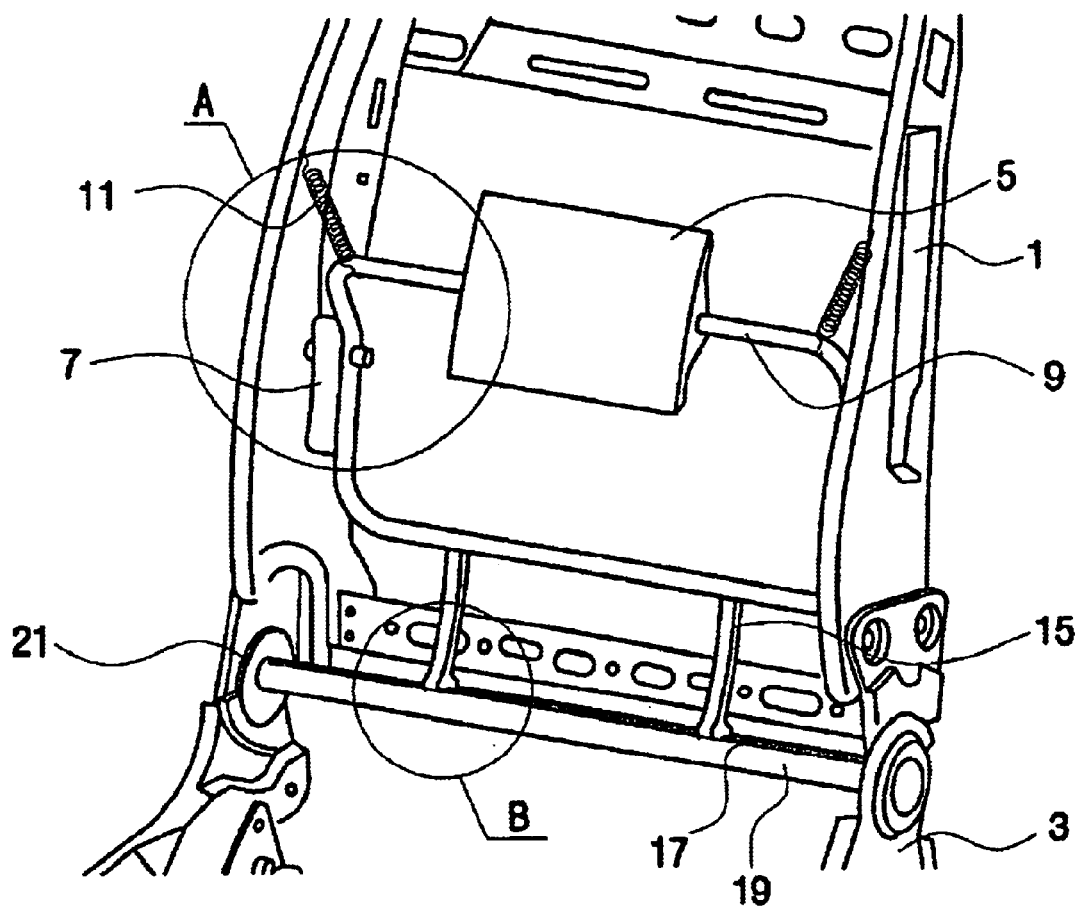
FIG. 2 is a detailed perspective view of the apparatus in FIG. 1.
Figure 3:
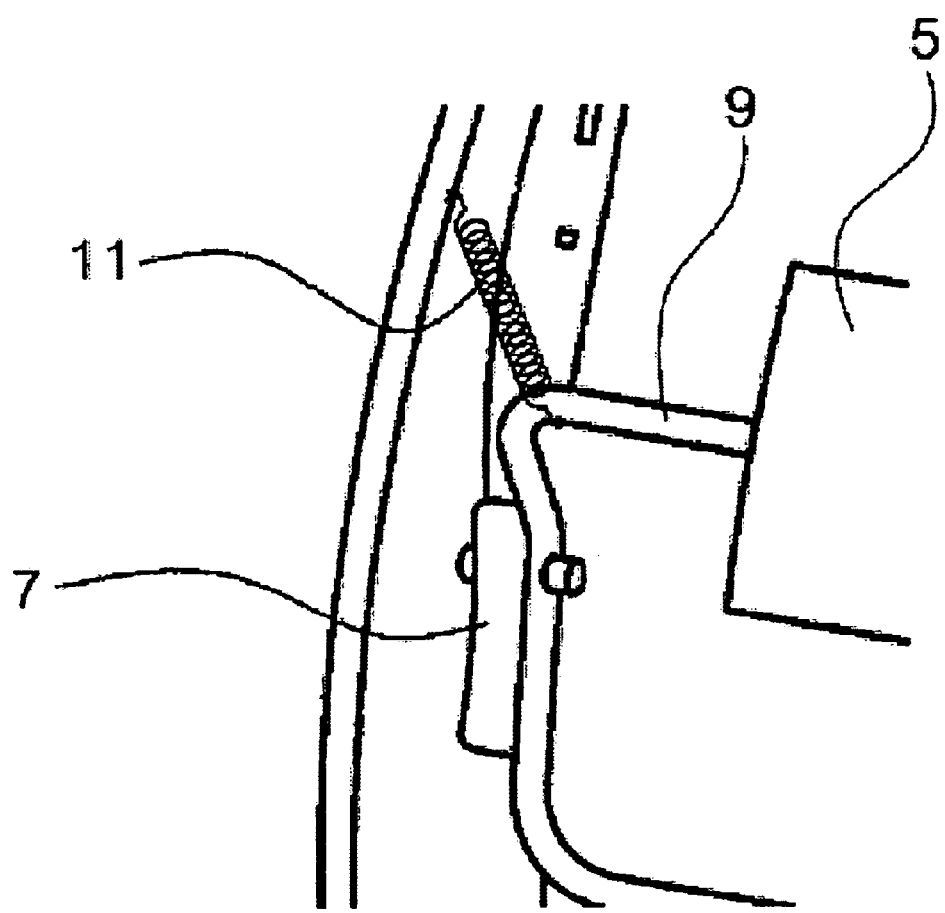
FIG. 3 is an enlarged perspective view of "A" portion of FIG. 2.
Figure 4:
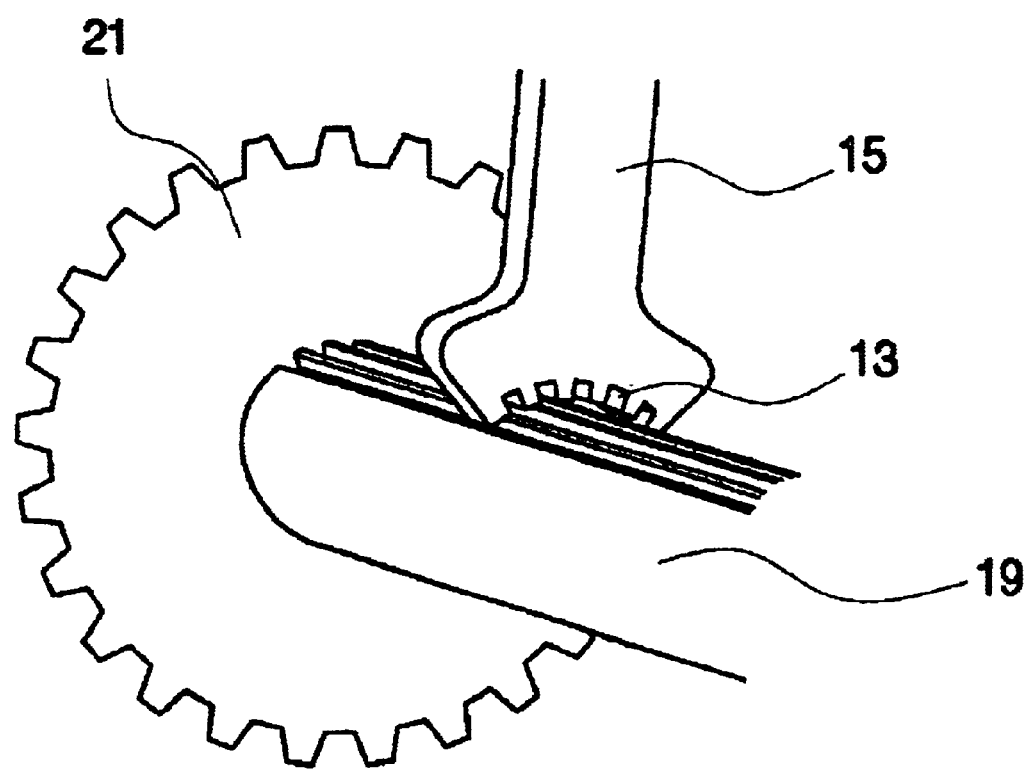
FIG. 4 is an enlarged perspective view of "B" portion of FIG. 2.

A preferred embodiment, as shown in more detail in FIGS. 2–4, includes supporting panel 5, a sliding bar 9, a spring 11, an upper gear bar 15 and a lower gear bar 19. The supporting panel 5 supports the back of the passenger, and it is installed in the seat frame 1 of the seat back. Further, the sliding bar 9 is attached to the supporting panel 5, and moves up and down following the guide bracket 7, which is installed in both ends of the seat frame 1.

Springs 11 elastically connect the sliding bar 9 to the seat frame 1, so that the sliding bar 9 is elastically biased. The upper gear bar 15 extends downwardly from the lower end of the sliding bar 9, and has gear teeth formed on the front end thereof.

The lower gear bar 19 is disposed to connect both front ends of the seat cushion frame 3, and has gear teeth running longitudinally there along.

When the automobile is impacted, such as by a rear end collision, the upper body of the passenger in the front seat is forced back, and then the seat back is acted on by the force generated from the acceleration of the upper body. At this time, the supporting panel 5 supporting the back of the passenger is forced back by the pressure applied to the seat back and pushes the sliding bar 9 where the supporting panel 5 is connected. The sliding bar 9 moves downwardly following the guided bracket 7 installed in the seat back frame 1. The spring 11, connecting the sliding bar 9 to the frame 1, is elastically extended.

When the sliding bar 9 moves downwardly following the guide bracket 7, as shown FIG. 1 and FIG. 2, the upper gear bar 15 is contacted to the lower gear bar 19. Thus, the gear teeth 13 formed on the front end of the upper gear bar 15 are engaged with the gear teeth 17 formed longitudinally on the lower gear bar 19. Therefore, although the impact force applied to the upper body of the passenger due to a collision is transferred to the seat back, the seat back frame 1 installed in the seat back is supported, and it is not bent back because the upper gear bar 15 is engaged with the lower gear bar 19.

That is, in case a high load is applied to the seat back of the front seat due to a rear end collision, although the moment which tends to rotate backwardly against the recliner 21 is applied to the seat back, the upper gear bar 15, installed in the seat frame 1, is supported by the lower gear bar 19, installed in the seat cushion frame 3. Thus the moment generated in the seat back can be reliably resisted, and the recliner 21 controlling the rotating angle of the seat back can be safely locked. As a result, the recliner 21 controlling the rotating angle of the seat back can be confidently prevented from being damaged.

Meanwhile, when the impact load generated by the rear end collision dissipates, crashing of the rear part of the automobile is disappeared, the force pressing the supporting panel 5 is also removed. Thus the spring 11 elastically connecting the sliding bar 9 to the seat back frame 1 contracts, and the upper gear bar 15 and the lower gear bar 19 are separated from each other. Accordingly, in cases where an instantaneous impact dissipates, the seat back frame 1 can formally control the rotating angle of the seat back because only the recliner 21 can make the seat back frame 1 rotate.

With the apparatus for locking the recliner of the front seat in the automobile according to preferred embodiments of the present invention, when the impact is applied to the passenger taking the front seat due to rear end collision, the upper gear bar descends and contacts the lower gear bar. Thereby, the seat back is prevented from the sudden rotation and the recliner is reliably locked. The risk of injury to both passengers in the front and rear seats is therefor reduced.

While the present invention has been particularly shown and described with reference to a particular embodiment thereof, it will be understood by those skilled in the art that various changes in form and detail may be effected therein without departing from the spirit and scope of the invention as defined by the appended claims.

What is claimed is:

1. An apparatus for locking a seat back recliner in an automobile seat having a seat back and a seat bottom, the apparatus comprising:

a sliding bar disposed in the seat back for downward movement in response to impact forces transmitted thereto;

an upper bar attached to the sliding bar and extending downward therefrom;

locking members formed on an end of the upper bar opposite said sliding bar;

a lower bar attached to the seat bottom;

corresponding locking members formed on said lower bar such that when the sliding bar is moved downward due to impact force the upper bar locking members engage the lower bar locking members to lock the seat back with respect to the seat bottom; and biasing means acting on the sliding bar to bias said bar upward towards an unlocked position in the absence of an impact force.

2. The apparatus of claim 1, wherein said locking members comprise gear teeth.

3. An apparatus for locking a seat back recliner in an automobile seat having a seat back and a seat bottom, the apparatus comprising:

a sliding bar disposed in the seat back for downward movement in response to impact forces transmitted thereto;

an upper bar attached to the sliding bar and extending downward therefrom;

locking members formed on an end of the upper bar opposite said sliding bar;

a lower bar attached to the seat bottom; and corresponding locking members formed on said lower bar such that when the sliding bar is moved downward due to impact force the upper bar locking members engage the lower bar locking members to lock the seat back with respect to the seat bottom; and a support panel secured to an upper portion of the sliding bar.

* * * * *